S. R. PLUMB.
Sausage Stuffer.
No. 27,829.
Patented April 10, 1860.
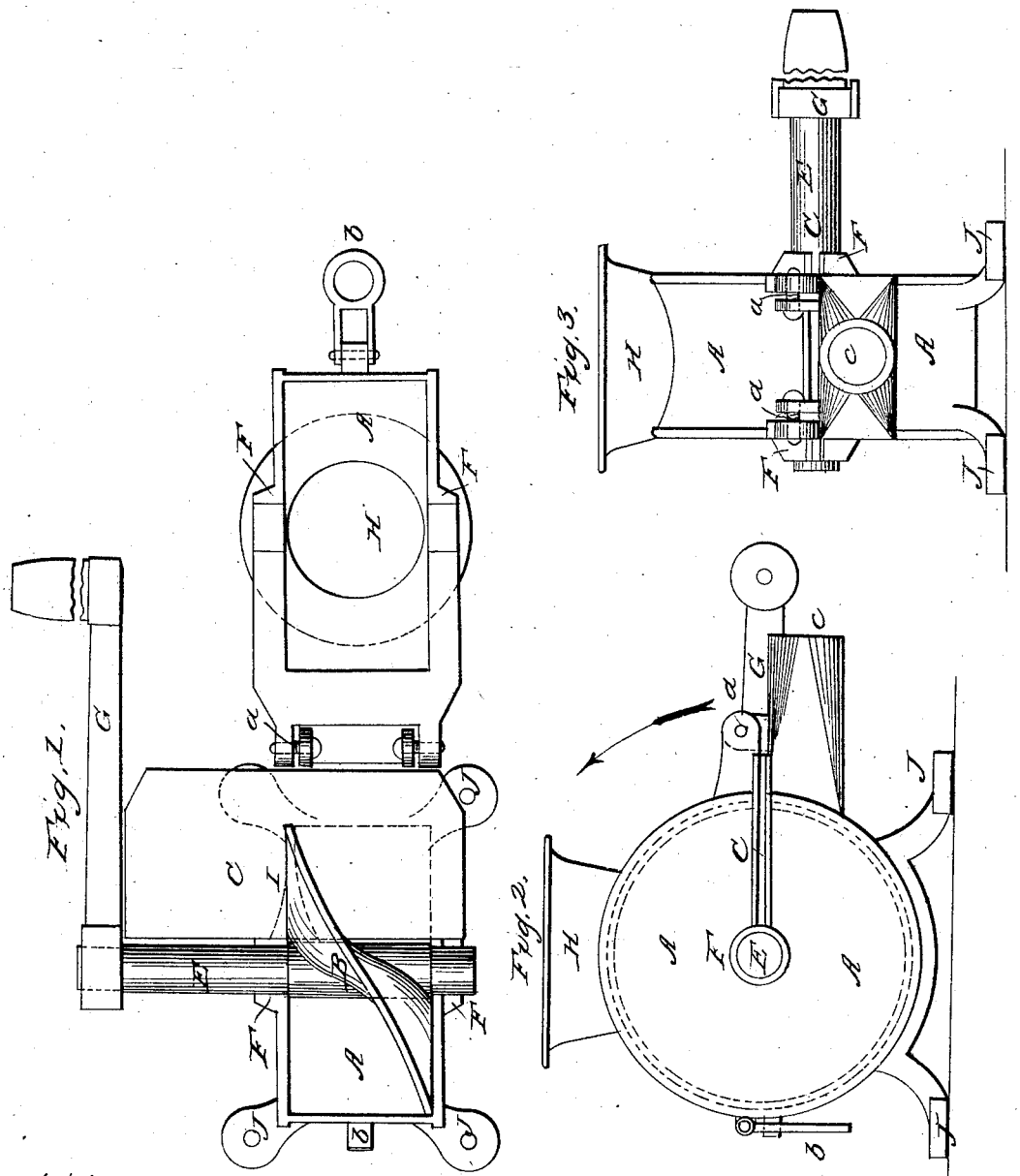

UNITED STATES PATENT OFFICE.

SALMON R. PLUMB, OF SOUTHINGTON, CONNECTICUT.

SAUSAGE-STUFFER.

Specification of Letters Patent No. 27,829, dated April 10, 1860.

*To all whom it may concern:*

Be it known that I, SALMON R. PLUMB, of Southington, in the county of Hartford and State of Connecticut, have invented a new and useful Sausage-Stuffer; and I hereby declare that the following specification, in connection with the accompanying drawings and references thereon, constitutes a lucid, clear, and exact description of the construction and use of the same.

In referring to the said drawings, Figure 1, is a plan or top view with case open; Fig. 2, a side elevation of the same with the case shut, or closed, as when in use. Fig. 3, denotes an end elevation of the same.

*Invention.*—The nature of my invention consists in the arrangement of a right and left screw on the same shaft, operating by turning it within a suitable case, and a slotted sliding plate so as to receive, and readily and easily force the cut meat within the sausage skin, all as will be hereinafter seen.

*Construction.*—To enable persons skilled in the art to which my invention appertains, to construct and carry out the same, I will proceed to describe it as follows: I construct an iron case seen at A, in two parts, hinged at *a*, and clasped at *b*. At one edge of this case an opening or nozzle *c*, is formed entirely in the lower half of case A, on which the sausage skin (not shown) is drawn to be stuffed. I construct a section of a right and left handed screw B, just large enough to revolve within the case A. As seen in the drawings, its shaft E is cast with it, and is fitted to turn transversely in journals F, of case A, by means of crank G. An opening or hopper H, is formed through top of case A, in which the cut meat is put in to stuff the sausage. I construct a sliding and divid-ing plate C, and recess the joint of top and bottom of case A, so that this plate will slide transversely and freely therein. A slot I, seen in red lines, full lines and dotted, Fig. 1, is formed at about the center of this plate, which fits on to the rim of right and left handed screw B, so that as the feeding or stuffing screw is turned, this plate will slide back and forth. The object of plate C, is to prevent the sausage meat from rotating too far and so that the screw stuffer receives it at hopper H, and force it around and through nozzle C, into the skin (not shown).
The case is secured firmly to table or bench, by feet J, with screws passing through them.

*Operation.*—All that is necessary to do in operating my within described machine, is to see that the parts are properly put together as per drawings. Then put in the meat, in hopper in suitable quantities, and draw the skin on nozzle C, and then turn the crank G, in the direction the arrow points, and the filling is easily and soon performed, and when done all the parts can be readily taken apart and washed or cleaned if desired.

*Advantages.*—The obvious advantages of my sausage stuffer consist in its great simplicity, cheapness, durability and celerity and ease in operation.

What I claim as my invention, and desire to secure by Letters Patent, is—

The arrangement and combination of case A, revolving right and left handed screw B, and sliding plate C essentially in the manner and for the purposes fully set forth and described.

SALMON R. PLUMB.

Witnesses:
MERIT N. WOODROFF,
H. R. BRADLEY.